Oct. 30, 1951 A. H. DICKINSON 2,573,316

COMMUTATOR

Filed May 23, 1941 2 SHEETS—SHEET 1

INVENTOR
Arthur H. Dickinson
BY
[signature]
ATTORNEY

Oct. 30, 1951 A. H. DICKINSON 2,573,316

COMMUTATOR

Filed May 23, 1941 2 SHEETS--SHEET 2

INVENTOR
Arthur H. Dickinson
BY
W. M. Wilson
ATTORNEY

UNITED STATES PATENT OFFICE 2,573,316

COMMUTATOR

Arthur H. Dickinson, Scarsdale, N. Y., assignor to International Business Machines Corporation, New York, N. Y., a corporation of New York Application May 23, 1941, Serial No. 394,884

39 Claims. (Cl. 250—27)

Figures 1, 2:
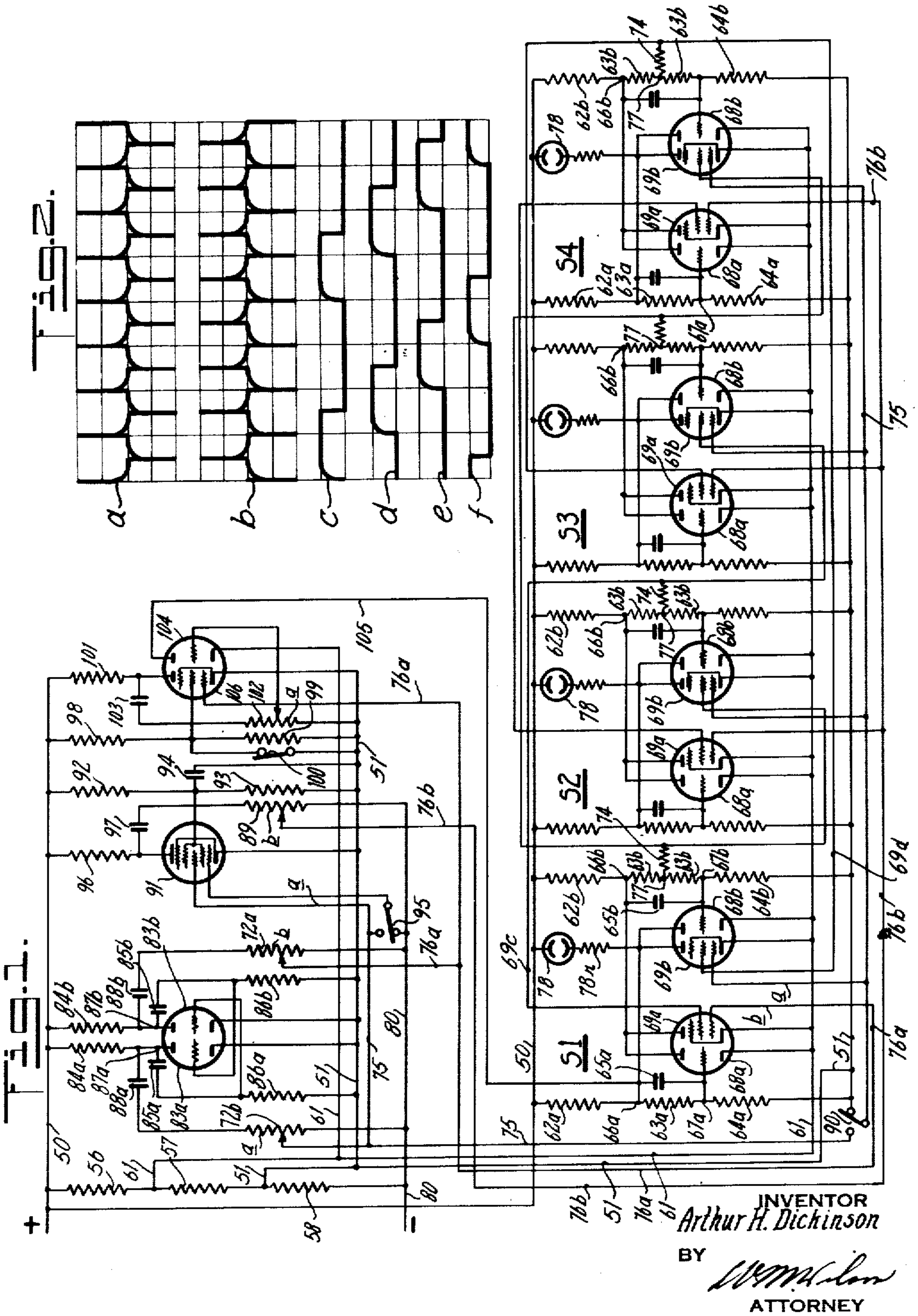

The present invention relates to purely electronic commutators or switching devices and more particularly to commutators comprising the so-called hard tube type electronic devices, one form of which is employed in the device of applicant's copending application Serial No. 394,881, filed May 23, 1941.

The invention embodies hard tube type electronic elements, conductively connected into a closed chain or ring, the current flow through any one element controlling the conditioning of a succeeding element to permit of its sequential operation and the subsequent current flow through the succeeding element controlling the conditioning of the preceding element to permit of its subsequent return to an initial status until conditioned by its associated element, and control electrical manifestations for operating and regulating the rate of operation of said ring.

Similar devices of the prior art have been utilized, but these devices have employed magnetrons, gas filled tubes of different types and other unstable devices which further require elaborate control apparatus for regulating the operation of the individual devices. Other devices of the prior art have employed hard tubes as elements of an electronic commutator or switching device but such tubes have been interconnected capacitatively or inductively or both, instead of conductively, and have operated by introducing a time delay in the sequential operation of the respective elements. Accordingly, one of the objects of the present invention is to avoid the use of a magnetron or of gas filled tubes and further to avoid the utilization of timing circuits and other inductive and capacitative connections between the respective elements comprising a purely electronic commutator.

Still another object is to provide a purely electronic commutator employing conductive connections between elements comprising hard tube type electronic devices.

Another object is to provide a purely electronic commutator employing electronic elements which are positive in action and which maintain an assumed electrical condition until control manifestations, such as electrical pulses, are applied to the respective elements.

Still another object is to provide a novel electronic commutator employing electronic elements, which are positive in action, which maintain an assumed electrical condition, and whose rate of operation is controlled by a plurality of electrical pulses of uniform electrical characteristics, spaced in time, in accordance with the rate of operation desired.

A further object is to employ electronic trigger circuits, adjustable to one composite maintained electrical condition and to the reverse composite maintained electrical condition, and means for conductively interconnecting said trigger circuits whereby a chosen composite condition can be sequentially passed from one trigger circuit to the next succeeding trigger circuit throughout a series of electronic elements arranged in tandem and then from the last in the series to the first, to provide an endless tandem, or ring, of electronic elements.

Another object is to provide a novel electronic commutator comprising a plurality of elements, conductively interconnected into a closed chain, each element comprising an ordinary triode and resistive circuit, and electronic means for alternately reversing the electrical condition in said circuit.

A further object is to provide a novel electronic commutator comprising a plurality of elements, conductively interconnected into a closed chain, each element comprising at least a triode, a resistive circuit connected to said triode, a pentode with its space current path connected in parallel with that of said triode and means including a source of electrical pulses, for operating and regulating the operation of said commutator.

Still another object is to provide a commutator comprising double sided electronic elements.

Another object is to provide an electronic commutator comprising a plurality of elements and each element comprising a plurality of portions, and means for advancing a chosen electrical condition through certain corresponding portions of said elements, in sequence, and then in sequence through the other corresponding portions.

A further object is to provide an electronic commutator comprising a double ring of electronic elements.

A still further object is to provide an electronic commutator, and means for initially setting or for resetting the elements of said commutator into a chosen pattern of assumed electrical conditions.

Another object is to provide a purely electronic commutator comprising a plurality of elements, which automatically adjusts itself into one of a desired sequence of patterns of electrical conditions of said elements.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is the wiring diagram of one form of completely electronic commutator, including commutator control and conditioning circuits.

Figs. 2–*a* and 2–*b* are diagrammatic illustrations of pulses employed for controlling the electronic commutator of Fig. 1.

Figs. 2–*c* to 2–*f*, inclusive, are diagrammatic illustrations of voltage conditions resulting from the operation of the elements comprising the commutator.

Figures 3, 4:
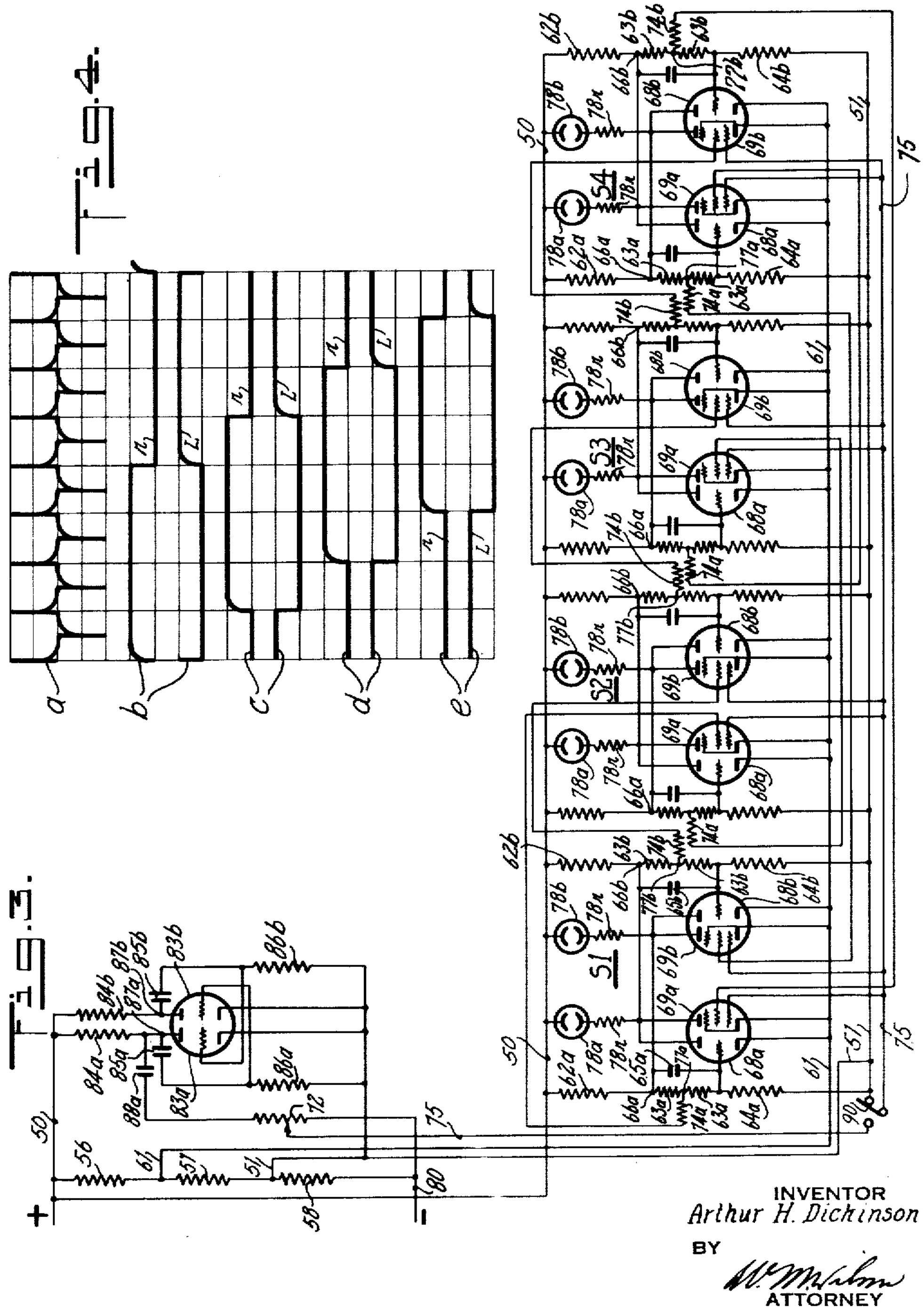

Fig. 3 is a wiring diagram of an electronic commutator including commutator control circuits, which is a modification of the electronic commutator, as illustrated in Fig. 1.

Fig. 4–*a* is a diagrammatic illustration of pulses employed for controlling the electronic commutator of Fig. 3.

Figs. 4–*b* to 4–*e*, inclusive, are diagrammatic illustrations of voltage conditions resulting from the operation of the elements comprising the commutator of Fig. 3.

Before proceeding to the detailed description of the electronic commutators, a brief outline will be given of the elements constituting the commutators, the control and the conditioning circuits therefor and the general theory of operation thereof.

1. *General*

The electronic commutator of the embodiment of Fig. 1 is composed of discrete elements which include electron tubes, the number of elements, in this embodiment, equalling the number of steps through which it is desired to progress before a cycle of operation is repeated. Each element may have either an "on" or an "off" status, as described presently, and at any particular time, one only of the total number of elements is in "on" status. The status of the elements is regulated under control of pulse producing means, such regulation consisting of a step-by-step operation of the elements whereby each element is placed first in an "on" and then in an "off" status. The electronic commutator operates continuously as long as pulses are available.

More specifically, each one of the elements may be turned on, under control of an element which immediately precedes it and is itself "on," and further each element may be turned off, under control of an element which immediately follows it and is itself "on." The elements of the commutator device are sequentially turned on and off, each element being so operated once, for each complete commutator cycle. Such action of the commutator provides a series of voltage changes, in sequence, or the commutator may be utilized to provide a series of sequentially timed pulses, which voltage changes or pulses are available for the control of operation of other circuits. The commutator operation is terminated by rendering the control pulses ineffective, whereupon the sequential operation is suspended and the last element switched on, remains in such status until control pulses are again applied. As described in detail later, the embodiment of the electronic commutator, as illustrated in Fig. 1, is conditioned by manually manipulating switches which control electronic circuits to produce conditioning pulses. Such pulses are effective to place all of the elements, except a chosen one, in an "off" status, and to place this chosen one in an "on" status.

2. *Electronic commutator element*

Referring to Fig. 1, voltage of the polarity indicated, namely, plus and minus, respectively, is supplied to the lines 50 and 80, and to a voltage divider comprising resistances 56, 57 and 58 in series across the lines 50 and 80. Lines 61 and 51 are tapped off the voltage divider whereby voltages of intermediate value are obtained, the voltage of the line 61 being positive with respect to that of line 51. A circuit, which will be hereafter designated as a trigger circuit, comprises two impedance networks which include, for example, resistances 62*a*, 63*a* and 64*a* (S1) in series across the lines 50 and 51, the resistance 63*a* being shunted by a coupling condenser 65*a*. Vacuum tubes 68*b* and 69*b*, which are shown as contained in one envelope, are connected with their space current paths in parallel between point 66*a*, at the junction of resistors 62*a* and 63*a* of the voltage divider, and line 61. The other impedance network comprises, for example, resistances 62*b*, the two halves of 63*b* and 64*b* (S1) connected in series between the lines 50 and 51, resistance 63*b* being divided into equal parts, as illustrated, and the entire resistance 63*b* being shunted by a coupling condenser 65*b*. Electronic tubes 68*a* and 69*a*, which are illustrated as enclosed in one envelope, are connected with their space current paths in parallel between point 66*b* at the junction of resistors 62*b* and 63*b* of this last voltage divider, and line 61. Resistance 62*a* is equal in value to 62*b*, and likewise resistances 63*a* and the complete resistance 63*b*, 64*a* and 64*b* are equal in value and the capacitances of condensers 65*a* and 65*b* are also equal. In actual practice an efficient combination was found when the values of resistances 62*a* and 64*a* were each approximately one-third the value of resistance 63*a*. A suitable value for the capacity of the condenser 65*a* was of the order of a few hundred micromicrofarads.

Assuming that the grid of tube 68*a* is at substantially the same potential as line 61, its grid bias will be substantially zero. With resistance 62*b* properly chosen, the impedance of tube 68*a* is relatively low as compared to that of resistance 62*b*, and the anode of tube 68*a* and the point 66*b*, to which this anode is connected, will have a voltage which is not much greater than that of line 61 when a large current flow occurs through 68*a*. With resistances 63*b* and 64*b* properly chosen, the potential drop across 63*b* is great enough to maintain point 67*b*, at the junction of resistors 63*b* and 64*b*, and therefore the grid of tube 68*b*, negative with respect to line 61. With tube 68*b* negatively biased, its impedance is greater than that of resistance 62*a*. Under these conditions, the anode of 68*b* and the point 66*a* are at a sufficiently high potential so that the voltage drop across 63*a* will not force the potential of point 67*a*, at the junction of resistors 63*a* and 64*a*, below that of line 61. This status defines one condition of stability of the element, in which condition tube 68*a* has a large current flow therethrough and tube 68*b* is at shut-off, and point 66*a* is at a higher potential, with respect to lines 61 and 51, than is point 66*b*. The manner of switching a trigger circuit to the other condition of stability is as follows: Electronic devices, such as pentodes 69*a* and 69*b*, may be employed for shifting a trigger circuit from one condition of stability to the opposite condition of stability. The screen grid (which will now be defined as a screen) of tube 69*a* is connected to a point whose potential is positive with respect to line 61 and the screen of tube 69b is likewise connected to a point whose voltage is positive with respect to line 61. Under these conditions, the screen potentials of tubes 69a and 69b are positive with respect to their cathodes. The control grid of pentode 69a (hereinafter designated as the grid) is connected via line 76a to a resistance 72a, upon which positive pulses are produced, in a manner to be described in detail later. In the absence of any pulse on resistor 72a, however, the negative grid bias of tube 69a is equal to the potential difference between lines 61 and 80 and is sufficiently great to maintain tube 69a at shut-off. The grid of tube 69b is similarly connected via line 75 and switch 90 (in its opposite position) to the resistor 72b, upon which there is produced positive pulses, in a manner to be described in detail later. In the absence of any pulse on resistor 72b, however, the bias of tube 69b has the same negative value as that of tube 69a, and 69b is also maintained at shut-off.

Assuming, as above, that there is a large current flow through tube 68a and that point 66b is at low potential; when a positive pulse is produced on the resistance 72a the negative bias of tube 69a will be reduced but since the anode of tube 69a is connected to point 66b and is therefore at low potential, this particular bias reduction is ineffective to increase current flow through tube 69a and therefore has no effect on the status of the trigger circuit. When a positive pulse is produced on resistor 72b and switch 90 is in the opposite position from that shown, the negative bias of tube 69b is reduced. Since the anode of tube 69b is directly connected to point 66a and since the potential of this point, with respect to line 61, is relatively high, current flow is produced as follows: From line 50, resistor 62a, tube 69b, line 61, resistances 57 and 58 to line 80, thereby producing an increased voltage drop across the resistance 62a and causing point 66a to suddenly drop in potential, thereby producing a negative pulse. This pulse is fed through condenser 65a to the grid of tube 68a, effecting a sudden increase in the negative grid bias thereof and reducing current flow through tube 68a and its associated resistance 62b. The potential of point 66b rises with respect to that of line 61 to produce a positive pulse which is fed through condenser 65b to the grid of tube 68b, changing its grid bias to substantially zero. Since, as described above, the potential of point 66b has now risen and that of point 66a has now dropped, tubes 68a and 68b assume a condition of stability, which is the reverse of that originally described, namely, tube 68a is now at shut-off while tube 68b passes a large amount of current. The new status of the trigger circuit will be maintained until a positive pulse appears on the resistance 72a. When this occurs, the resulting negative grid bias reduction of pentode 69a produces an increased current flow therethrough with a constant drop in the potential of 66b, and the trigger circuit is returned to the condition of stability originally described. It may be noted that to best achieve the operations as described above, the pulses applied to the grids of pentodes 69a and 69b should be of steep wave form. Preferably the RC product of the value of resistance 72a or of 72b and the value of the capacity of any respective associated condenser should not exceed one-fifth the RC product of resistance 63a and condenser 65a, for example. It should also be noted that negative pulses, applied to the grids of tubes 69a and 69b, are ineffective, to produce the shifting action just described.

The condition of any trigger circuit may be determined by observation of a glow discharge (neon) tube such as 78, connected in series with a current limiting resistor 78r between line 50 and point 66a When point 66a is at a high potential with respect to line 61, the difference in voltage between line 50 and point 66a is insufficient to ignite the discharge tube 78. When, however, point 66a is at a low potential with respect to line 61, the difference in voltage is great enough to cause neon tube 78 to fire. As described just above, it is noted that electron tubes and circuit elements are so interconnected and operated as to produce alternate conditions of stability. The triggering pulses are derived from two different sources and are effective alternately in each of the two branches of the trigger circuit to cause it to shift back and forth from one condition of stability to the other. Electron tubes and the associated electrical elements, which have been designated as a trigger element, are hereinafter designated simply, as an element, and a plurality of such elements are interconnected. as described presently, to produce the embodiment of the electronic commutator, as illustrated in Fig. 1 and are also employed, in a different manner, however, to produce that embodiment of the electronic commutator, as illustrated in Fig. 3. It is assumed for purposes of description that when points 66b and 66a, of any one element, are at high and low potential, respectively, with respect to lines 61 and 51, the element is in an "on" status and that when the potentials of points 66b and 66a are low and high, respectively, the element is in an "off" status. Voltages which exist at points such as 66b and 66a of the respective trigger elements and which vary in accordance with the particular condition of stability, may be employed for various control purposes.

3. *Oscillatory*

As stated above, pulses are produced on resistances 72a and 72b for controlling the operation of the electronic commutator. Preferably, the source of such pulses is an oscillator whose output of square-topped waves is modified into pulses of steep wave front and of short duration. The desired duration of one complete cycle of operation of the electronic commutator determines the chosen base frequency of the oscillator.

The oscillator employed herein is of the type commonly known as a multi-vibrator. Essentially, it consists of a two-stage resistance coupled amplifier in which the output of the second stage is fed back to the input of the first. Such an oscillator is capable of producing either square-topped or saw toothed waves, depending upon which portion of the oscillator circuit is employed. The square-topped waves are utilized herein because of their suitability for conversion into pulses of extremely sharp wave front and short duration.

Referring to Fig. 1, voltage of the polarity as indicated, namely, plus and minus, respectively, is supplied to the lines 50 and 80 and to the voltage divider 56, 57, 58. Potential is also supplied by means of this divider to the lines 61 and 51, their potentials being positive, with respect to each other, in the order given and with respect to line 80. The oscillator comprises vacuum tubes 83a and 83b and associated resistances and condensers. The anodes of the respective tubes are connected to line 50 through load resistors 84a and 84b while the cathodes are directly connected to line 51.

The anode of tube 83a is coupled back to the grid of tube 83b by means of coupling condenser 85a which is also connected to line 51 through the grid leak resistance 86a. The anode of tube 83b is coupled back to the grid of tube 83a by means of coupling condenser 85b, which is also connected to line 51 through the grid leak resistance 86b. With this circuit connection, the normal bias of the grids 83a and 83b is zero. Such an arrangement is unstable and oscillations are initiated by a minute change of emission of either tube. Assuming that the current through 83a momentarily increases, this produces an increased voltage drop across resistance 84a and a decrease in potential across tube 83a. This decrease is fed by coupling condenser 85a to the grid of tube 83b, making it more negative. Current through 83b is decreased, decreasing the voltage drop across resistance 84b and increasing the voltage drop across tube 83b. This increase is equal to the original decrease across tube 83a multiplied by the amplification factor and is thus much higher. Coupling condenser 85b conveys this potential change to the grid of tube 83a making said grid much less negative with a resulting rapid increase in the current through 83a. The voltage drop due to this increased current is in turn fed to 83b with cumulative results. Actually the current flow through tube 83a is increased to a high value, substantially instantaneously, which flow reaches a maximum when the grid of tube 83b has a negative potential great enough to reduce the current flow through tube 83b to zero. When this condition is reached, the charge on condenser 85a commences to leak off through resistance 86a, the time consumed being determined by the time constant of the condenser 85a and resistance 86a. When this leakage is complete, current flow in tube 83b begins and the operation above described reverses, that is, the grid of 83a will instantaneously become negative, shutting off flow through tube 83a, and the grid of tube 83b will instantaneously become slightly positive and heavy flow will occur in tube 83b.

It will now be understood that a heavy current flows alternately and for a given period of time through each of the tubes 83a and 83b. When one tube is conducting, the other tube is shut off, this situation then instantaneously reverses and said one tube is shut off and the other conducts. This produces alternate and sustained voltage drops across resistors 84a and 84b, these voltages being 180 degrees out of phase with each other. These voltages are in the form of square-topped waves, easily converted into pulses that possess a steep wave front and which are extremely short in duration.

A rise in potential of point 87a, at the junction of resistor 84a and the plate of tube 83a, causes charging of condenser 88a and current flow through resistor 72b to line 80. By suitably choosing the value of condenser 88a so that its recovery time is relatively short, the rise of potential of 87a produces on resistor 72b, a positive pulse of extremely short duration having a steep wave front. A decrease in the potential of point 87a causes condenser 88a to discharge and a negative pulse of the character just noted is thereby produced on resistor 72b. Since the rise and fall of point 87a is constantly recurring, positive and negative pulses are continually produced on resistance 72b, as illustrated in Fig. 2–*a*. In a similar manner, positive and negative pulses are continually produced on resistance 72a due to the rise and fall in potential of point 87b located at the junction of resistor 84b and the plate of tube 83b, and these pulses are illustrated in Fig. 2–*b*. It is to be noted, that, as would be expected, the pulses on these resistances are 180 degrees out of phase.

Pulses of the character, as illustrated in Figs. 2–*a* and 2–*b* are employed for controlling the sequential operation of the electronic commutator by controlling the elements, as described above.

The manner in which the control of the trigger elements is utilized for regulating the operation of the electronic commutator will now be described in detail.

4. *Electronic commutator*

The circuit of the electronic commutator, as illustrated in Fig. 1, comprises, essentially, a number of elements, as described above, conductively connected into a closed chain or ring, the number of elements employed depending upon the number of steps through which it is desired to progress before the ring repeats its functions. In the embodiment, as illustrated in Fig. 1, four such elements are employed. Assuming that one of the elements of the circuit is "on" and the remaining ones are "off," the former element conditions the next succeeding or second element, so that upon the occurrence of a pulse, termed an advancing pulse, the conditioned element is turned on. This next element, when "on," in turn conditions the element just preceding, so that upon the occurrence of a pulse, termed a restoring pulse, which occurs prior to the next advancing pulse, this preceding element is turned off. The second element which is now "on," in turn conditions a third element, so that when the following advancing pulse occurs, this third element is switched on. In such status, the third element so conditions the second element, that upon the occurrence of the next restoring pulse, the second element is turned off.

The above has explained generally the operation of the commutator when two advancing and two restoring pulses cause the "on" circuit position to advance by two. Were advancing pulses no longer applied, the third element would stay "on" and the remaining ones "off." When, however, the advancing pulses were again applied, stepping operations would again occur and the fourth, first, second, etc. elements would be turned on in sequence. When the total number of elements is four, as illustrated in Fig. 1, the first element is conductively connected to the last, so that the elements electrically form a closed chain or ring and the first element is switched on under control of the fourth one, and the commutator thereafter repeats its cycle of operation. It is seen, therefore, that the elements are so interrelated and so intercontrol one another that upon the application of succeeding advancing and restoring pulses, there is a step-by-step conditioning of each of the elements, in first an "on" and then in an "off" status. Each element so functions in a definite sequential order, and, when the final one of a series is operated, one cycle of the commutator is completed and a new cycle can be initiated.

The principle and details of operation of one embodiment of electronic commutator may be understood by reference to Fig. 1 which illustrates a basic circuit of four positions, it being understood that the number of positions can be chosen, as desired. The number of elements in this embodiment is therefore four and these elements are respectively designated as S1, S2, S3 and S4. Corresponding portions of different elements are given the same reference characters.

Referring to Fig. 1 and assuming that S1 is "on" and that S2, S3 and S4 are "off," the manner in which the latter three elements are turned on in succession will now be described in detail. It is also assumed that the oscillator is now in operation and that pulses of the character as shown in Figs. 2–*a* and 2–*b* are respectively produced on resistors 72*b* and 72*a*. It is to be noted that the pulses illustrated in Figs. 2–*a* and 2–*b* are of the same frequency but 180 degrees out of phase. Such symmetrical separation of the pulses, however, is not essential. The pulses as illustrated in Fig. 2–*a* and which are produced on resistor 72*b* are herein designated as *a*-phased pulses while those illustrated in Fig. 2–*b* and produced on resistor 72*a* will be designated *b*-phased pulses. As described in detail later, *b*-phased pulses are also produced on resistor 89 (Fig. 1).

The *a*-phased pulses on resistor 72*b* are applied via line 75 and switch 90 (when reversed) to the control grids of all tubes 69*b* and the *b*-phased pulses on resistors 72*a* and 89 are applied via lines 76*a* and 76*b*, respectively, to the control grid of tube 69*a* of S1 and to the control grids of tubes 69*a* of S2, S3 and S4, respectively. To place the commutator in continuous operation, the switch 90 is thrown to the reverse position from that shown.

The screen of tube 69*b* (S2) is conductively connected to the mid-point 77 of resistor 63*b* (S1) through a screen current limiting resistor 74. By virtue of this connection, the screen voltage of tube 69*b* (S2) is determined by that of point 77 and, if S1 is "off," point 77 is near the potential of line 61, whereas, if S1 is "on," point 77 is at a high potential with respect to line 61. When the screen voltage of tube 69*b* (S2) is low, a reduction of its negative grid bias has no effect on the tube. That is, a low screen voltage of tube 69*b* (S2) serves as a shut-off for the tube. On the other hand, when the screen voltage of tube 69*b* (S2) is high, a reduction of its negative grid bias causes increased current flow therethrough. For the normal grid bias applied to the grid of tube 69*b* (S2), a rise in its screen voltage has no effect on current flow through the tube. Assuming that S1 is "on," point 66*b* (S1) and the screen of tube 69*b* (S2) are at a high potential, so that S1 conditions S2 in order that it may be turned on, when an advancing pulse is applied to the grid of its tube 69*b*. The pulses produced on resistor 72*b* are designated as advancing pulses and one of them is effective via line 75 and switch 90, in its reverse position, to reduce the negative grid bias of tube 69*b* (S2) increasing current flow therethrough and thereby tripping S2 to an "on" status, as described above in Section 2. The rise in potential of point 66*b* (S2), coinciding with an advancing pulse, is indicated in Fig. 2–*d*. Comparison of this figure with Fig. 2–*c* indicates that momentarily both S1 and S2 are "on."

The screen of tube 69*a* (S1) is conductively connected via line 69*c* to the mid-point 77 of resistor 63*b* (S2) through a screen limiting resistor 74. By virtue of this circuit arrangement, the screen voltage of tube 69*a* (S1) is determined by that of point 77 (S2). If S2 is "off," point 77 is near the potential of line 61, and, if S2 is "on," point 77 is at a high potential with respect to line 61. Thus the screen potential of tube 69*a* (S1) varies in the same manner. When the screen potential of tube 69*a* (S1) is low, a reduction of its grid bias has no effect. That is, a low screen voltage of tube 69*a* (S1) acts as a shut-off for the tube. On the other hand, when the screen voltage of tube 69*a* (S1) is high, (which is the condition assumed in Section 2) a reduction of its negative grid bias causes increased current flow therethrough. For the normal grid bias applied to the grid of tube 69*a* (S1), a rise in its screen voltage has no effect on current flow in the tube.

Since S2 is now "on," as described above, point 77 of S2 and the screen of tube 69*a* (S1) are at a high potential, so that S2 conditions S1 in order that it may be turned off, when a restoring pulse is applied to the grid of tube 69*a* (S1). The pulses produced on resistor 72*a* are designated as restoring pulses and when one of these is effective via line 76*a*, to reduce the grid bias of tube 69*a* (S1) increasing current flow therethrough, S1 is tripped to an "off" status, in the manner described in Section 2. As a result of this operation, point 66*b* (S1) drops to a low potential, as indicated in Fig. 2–*c*.

If no further pulses were produced on resistances 72*b* and 72*a* or if the pulses on 72*b* were rendered ineffective, S2 would remain "on" while S1, S3 and S4 would remain "off." This would be indicated by the fact that the glow tube 78 (S2) would be ignited while those related to the other elements would be dark. If it be assumed, however, that advancing and restoring pulses are continuously produced on resistors 72*b* and 72*a*, respectively, and are continuously applied to the ring of commutator elements, the commutator will be continuously operated. It is to be noted that S2 and S3 are conductively interconnected in the same manner as S1 and S2, as described above, and S3 and S4 are similarly conductively interconnected. To continue the above description, with S2 "on," there is a conditioning of S3, since point 77 (S2) and the screen of tube 69*b* (S3) are at a high potential. Therefore, when the next advancing pulse from resistance 72*b* is effective via line 75 and switch 90 to reduce the grid bias of tube 69*b* (S3), current flow is increased therethrough thereby tripping on S3. The resultant rise in potential of point 66*b* (S3), coinciding with an advancing pulse, is indicated in Fig. 2–*e*. It is seen from a comparison of Fig. 2–*e* with Fig. 2–*d*, that momentarily, both S2 and S3 are "on." With S3 "on," point 77 thereof and the screen of tube 69*a* (S2) are at a high potential. It is seen therefore that with S3 "on," it conditions S2, so that S2 may be shut off by the next restoring pulse on line 76*b* which is effective to reduce the grid bias of tube 69*a* (S2) increasing current flow therethrough and thereby turning "off" S2. The resultant fall in potential of 66*b* (S2) is illustrated in Fig. 2–*d*. S3 being "on" conditions S4 so that the latter may be turned on when the next succeeding advancing pulse appears on line 75. The manner in which S4 is tripped on is similar to that in which S2 and S3 were tripped on, as explained above. When S4 is tripped on, the voltage of point 66*b* (S4) rises in potential, as is illustrated in Fig. 2–*f*. S4 being "on," conditions S3, so that S3 is tripped off by the next succeeding restoring pulse appearing on line 76*b* and applied to the grid of 69*a* (S3). The manner in which S3 is turned off is similar to that in which S1 and S2 are turned off, as explained above. The resultant fall in potential of 66b (S3), is illustrated in Fig. 4–e. S4 being "on," also conditions S1, since S4 is conductively connected to S1 in the same manner that S1 and S2, S2 and S3, S3 and S4 are conductively interconnected, the elements being thereby connected in a closed circuit or ring. With S1 so conditioned it will be turned on when the next succeeding advancing pulse appears on line 75. The manner in which S1 is turned on is similar to that in which S2, S3 and S4 were turned on, as explained above. When S1 is turned on, point 66b (S1) rises in potential as is illustrated in Fig. 4–c. S1 being "on," conditions S4 so that it is tripped off by the next succeeding restoring pulse appearing on line 76b and applied to the grid of tube 69a (S4). S4 is turned off in the same manner in which S1, S2, S3 were turned off, as explained above. The resultant fall in potential of 66b (S4), is illustrated in Fig. 4–f. With S1 now "on" for the second time, a commutator cycle has been fully completed throughout the ring of elements and sequential operations will begin to repeat with a continuous step-by-step turning on of S2, S3, S4, S1, etc.

It is now obvious that as long as advancing and restoring pulses are applied to the commutator circuit, the elements S1, S2, S3, S4, etc. are tripped on and off sequentially and independently of any inductive or capacitative coupling since the elements are interconnected conductively only. It is also seen that a given element cannot be turned on until its predecessor element is "on" and that a given element cannot be turned off until the succeeding element is "on." With this arrangement, therefore, step-by-step progression within the ring, from one element to the next, is entirely positive in character. It will be understood, from the above, that since elements S1, S2, etc. are placed in "on" and "off" status sequentially, a series of sequential voltage changes is produced. Reference to Figs. 2–c to 2–f, inclusive, indicates the respective distribution of the sequential times at which the points 66b of the elements S1, S2, etc. are at high and low potentials. It will be further appreciated, that when point 66b of S1, for example, is at a high potential, point 66a of the same element is at a low potential. Accordingly, decreased potentials are also sequentially produced by the operation of the elements, said decreases being effective at the respective points 66a of the elements and occurring at the relative times as indicated by Figs. 2–c to 2–f, inclusive. These sequentially timed voltage changes may be employed for the control of operation of external circuits.

Referring to Fig. 1, whenever switch 90 is returned to the position, as shown, application of advancing pulses to the ring of commutator elements is interrupted and the continuous operation of the commutator ceases. As is now evident, the element which was turned on, under control of the last advancing pulse, remains in "on" status, while the other elements remain in "off" status. Upon such return of switch 90 to the position, as shown, any one of the elements S1, S2, etc. may be retained in "on" status, while the other elements are retained in "off" status. When switch 90 is reversed from the position, as shown, the commutator resumes its continuous operation, beginning with the element which is "on" and continuing therefrom, so that there is no necessity for restarting the commutator from any arbitrarily chosen element. Instead of supplying control voltages sequentially, the commutator may be employed to provide sequentially timed pulses, either separately or concurrently with the production of sequential sustained control voltages. By coupling, for example, a point 66b of any element, through a condenser and a resistor (not shown) to either line 61 or 51, if the recovery time of the condenser is relatively short, positive and negative pulses will be produced on said resistance whenever the potential of point 66b rises and falls, respectively. By similarly connecting similar circuit elements to either points 66b or 66a of the other elements, it is seen that a plurality of positive and negative pulses, sequentially timed with respect to one another, can be made available when the commutator is continuously operated.

Further consideration of the commutator circuit of Fig. 1 indicates that advancing pulses, are effective via line 75, when switch 90 is in its opposite position, to concurrently reduce the negative grid bias of all tubes 69b of each of the elements S1, S2, S3 and S4, respectively. Likewise, restoring pulses are effective via lines 76a and 76b to concurrently reduce the grid bias of all tubes 69a of each of the elements S1, S2, S3 and S4, respectively. It will be appreciated, however, that a negative grid bias reduction of any one tube 69b, due to an advancing pulse, can cause increased current flow therethrough, only when its screen is at high potential, and such screen is at this high potential, only when a preceding element is "on." This preceding element is the sole one which is "on" when an advancing pulse is applied. Therefore, the reduction of the grid bias of all tubes 69b is selectively effective, only in the conditioned one, and it alone is tripped on. It will be also understood that a negative grid bias reduction of any one tube 69a, due to a restoring pulse, causes increased current flow therethrough, only when its screen grid is at high potential, and such grid is at this high potential, only when a succeeding element is "on." Therefore this reduction of negative grid bias of all tubes 69a is selectively effective, only in the conditioned one, to trip it off (all other elements, save the succeeding one, already being "off" and this succeeding one having no properly related "on" element to trip it off).

Assuming as before, that S1 is "on," then the screen of tube 69b (S2) is at a high potential and an advancing pulse, which reduces its grid bias, causes increased current flow therethrough, and S2 is tripped on, as is now understood. As such action occurs, point 77 (S2) begins to rise in potential as does also the screen voltage of tube 69b (S3) connected to said point. It would therefore appear, at first blush, that the advancing pulse which trips on S2, might, by virtue of the resulting screen voltage rise of tube 69b (S3), also cause S3 to trip to an "on" status. This rise in potential of point 77 (S2) however, to its full value, is not instantaneous, but occurs exponentially (see Fig. 2–d), so that an interval of time elapses from the instant of pulse application until point 77 (S2) reaches its maximum high voltage, and the same applies also to the screen voltage rise of tube 69b (S3). This time interval, exceeds the duration of an advancing pulse, so that said pulse ceases to exist by the time that the screen of tube 69b (S3) reaches its maximum potential. Under these circumstances, pentode 69b (S3) experiences concurrently an increase of negative grid bias (because the amplitude of the advancing pulse is decreasing from its positive peak value) and an increase of positive screen voltage, which two conditions oppose and thus prevent any substantial current flow through the pentode. It is seen, therefore, that only one element is tripped on for each advancing pulse. A slight current flow may occur in a tube of another element, such as S3, for example, but its magnitude is insufficient to trip S3 to an "on" status.

5. *Conditioning—Electronic commutator*

As will be described in detail in the concluding portion of this section, it is necessary, prior to operation of the device of the present invention, to condition the same. This operation is performed in two steps: the first turns off any of the commutator elements S2, S3 and S4 which are "on," and the second turns on the element S1, which is arbitrarily chosen for this purpose.

As was stated generally, in Section 4, *b*-phased pulses are produced on resistance 89 which are effective via line 76b to restore any of the commutator elements S2 to S4, inclusive, which are "on," to an "off" status, when a following element is turned on during the sequential operation of the device. Before proceeding with the description of the conditioning of the electronic commutator, the details of the circuits by which *b*-phased pulses are produced on resistance 89 will be described.

Line 75 (to which *a*-phased pulses are applied from resistance 72b) is connected to the No. 3 grid of the pentagrid mixer tube 91. The No. 2 and No. 4 grids of tube 91 are internally joined and externally connected to the junction of resistances 92 and 93, which together form a voltage divider between lines 50 and 51. Condenser 94 aids this divider in maintaining constant the potential of the No. 2 and No. 4 grids of tube 91, for current variations therethrough. Grid No. 1 of tube 91 is normally connected to line 80 by means of a switch 95, in the position as shown. The anode of tube 91 is connected to line 50 through a load resistance 96, which is coupled to resistance 89 by means of condenser 97. The No. 1 grid or the No. 3 grid, or both together, may control the amount of plate current handled by the tube 91. In the normal operation of this tube, as described above, the bias of the No. 1 grid is maintained constant while *a*-phased pulses continually vary the bias of the No. 3 grid. Resulting current flow variations through the tube and through resistance 96 causes *b*-phased pulses to appear on resistance 89. The amplitude of the pulses appearing on this resistance is sufficient for the ordinary electronic commutator control purposes described previously.

In order to condition the electronic commutator, switch 95 is thrown to the reverse position, connecting the No. 1 grid of tube 91 to line 75. With switch 95 in this reverse position, *a*-phased pulses are concurrently applied to the No. 1 and to the No. 3 grids of tube 91, and produce an effective bias reduction which is greater in magnitude than that caused by the No. 3 grid alone, when the switch 95 is in the position, as shown. Accordingly, concurrent flow through tube 91 is greater in magnitude than that caused by the bias reduction of the No. 3 grid alone. Resultant voltage drops across resistance 96 are increased in magnitude, as is also the amplitude of *b*-phased pulses produced on resistance 89. Such increased amplitude is greater than that of pulses appearing normally thereon. These *b*-phased pulses of increased magnitude are applied to line 76b to restore any of the S2 to S4 elements, inclusive, which are "on," to an "off" status, as will now be described.

Assuming that S3 is the sole element which is "on." Even though the screen potential of tube 69a (S3) is low (since S4 is "off") the *b*-phased pulses of increased amplitude now appearing on line 76b produce a greater than normal grid bias reduction of tube 69a (S3), increasing flow therethrough sufficiently to turn S3 from an "on" to an "off" status. It is deemed clear that the first of the *b*-phased pulses of increased amplitude appearing on line 76b is effective to accomplish this result. Succeeding similar pulses appearing on line 76b have no further effect and they merely continue until switch 95 is returned to the position, as shown. Having thrown switch 95 first to the reverse position from that shown and then having returned it to the position, as illustrated, the operator has turned off any of the elements S2, S3 and S4 which are "on." To complete the conditioning of the commutator, another switch is operated to turn on S1, as will now be described. Line 76a, to which *b*-phased pulses are applied, is connected to the grid of tube 106. The screen of tube 106 is connected to the junction of resistances 98 and 99, which together form a voltage divider between lines 50 and 51. The screen potential of tube 106 is normally maintained at the potential of line 51, since switch 100 is maintained normally closed, as shown, and therefore bias variations of its grid have no effect on current flow through the tube. The anode of tube 106 is connected to line 50 through a load resistance 101 which is coupled by condenser 103 to a resistance 102. Any positive potential appearing on resistance 102 is effective to produce a negative grid bias reduction of tube 104. The anode of tube 104 is connected via line 105 to point 66a (S1). In order to complete the conditioning operation, switch 100 is opened, thus removing the shunt from resistance 99 and effecting a rise in the screen potential of tube 106. Grid bias reductions of tube 106, controlled by the *b*-phased pulses appearing on line 76a, cause increased current flow through this tube and its load resistance 101, so that *a*-phased pulses are produced on resistance 102. The first positive pulse appearing on resistance 102 is effective to reduce the grid bias of tube 104, increasing current flow therethrough and producing, via line 105, a voltage drop across resistance 62a (S1) with the resulting shift of element S1 from an "off" to an "on" condition. It is appreciated that the first of the *a*-phased pulses applied to tube 104 is effective to accomplish this result. Succeeding similar pulses, applied to this tube, have no further effect and merely continue to appear until switch 100 is returned to the closed position, as shown.

Upon placing the commutator in use, by applying current to lines 50, 80, etc. the status which the respective elements S1, S2, etc. may reach, may be either "on" or "off," and is governed by chance. The commutator is thereupon conditioned, in the manner just described, whereupon switch 90 is thrown to the reverse position from that shown, thereby placing the ring of elements comprising the commutator in continuous operation. It is only upon starting the commutator into operation that the above conditioning of the commutator is required.

It is deemed obvious, that by supplying a second, third, etc. series of four elements, each of the four connected respectively in parallel to the individual elements S1, S2, etc. and with the first element of the first series connected to the last element of the last series and the first element of the second series, for example, connected to the last element of the first series, a plurality of electrical effects can be produced, simultaneously, at each of the series of time positions, in a chosen time sequence.

6. *Self-conditioning type electronic commutator*

There is illustrated, in Fig. 3, a modification of the electronic commutator of Fig. 1, which modification is self-conditioning. In other words, upon initiating operation of this modification of the electronic commutator, the proper sequence of operation of the respective parts of the commutator will be automatically assumed, without employing any conditioning means such as described above in connection with the embodiment of Fig. 1. The electronic commutator of the embodiment of Fig. 3 is composed of discrete elements, which are similar to the elements employed in the embodiment of Fig. 1 but it is to be particularly noted, that the number of elements is less than the number of steps through which it is desired to progress before a full cycle of operation is repeated. Each of two portions, of any one element, may have either an "on" or an "off" status, and when one portion is "on," its companion portion is in the reverse or "off" status. The status of the elements is sequentially determined under control of pulse producing means of the same type as disclosed in Fig. 1. There is produced, under control of these pulse producing means, a step-by-step operation of the elements, whereby, beginning with the element succeeding the last element to be operated, corresponding portions of each element are placed in a similar status successively, until all element portions of a ring have been operated, following which these portions of each element are placed in a reverse status, successively, until all companion portions of a ring have been operated, and thereupon the full step-by-step operation through the double ring of elements is repeated. The operation of the electronic commutator is continuous, once it is placed in operation.

As stated above, this embodiment of the electronic commutator requires no manual conditioning, but is brought into action and conditions itself by a single manual manipulation when operation of a commutator is initiated. In the operation of the commutator, one portion of each element of a ring of elements may be turned "on," under control of a corresponding element portion, which immediately precedes it in the step-by-step operation and is itself "on," with the exception that at each completion of a ring operation, mentioned above, a given portion of an element may be turned on under control of the opposite portion of the element which immediately precedes it in the step-by-step operation. It will therefore be understood that the element portions of the commutator are continually and successively turned both on and off, each element portion being operated twice, for each complete double ring commutator cycle of operation. Such operation of the commutator elements provides two pulses, for each of the elements, and the resulting plurality of pulses is equal to twice the number of elements employed in the commutator.

The elements themselves, employed in the embodiment of Fig. 3, are the same as those employed in the embodiment of Fig. 1, with the exception that two indicating glow discharge (neon) tubes are employed for each element, one of these tubes 78b and its series resistor 78r being connected in series between line 50 and point 66a of its associated element and the other glow discharge tube 78a and its associated resistor 78r being connected in series between line 50 and point 66b of its associated element. When point 66a is at a high potential, as is now well understood, point 66b is at low potential and tube 78a will be ignited. When point 66b is at high potential, point 66a will be at low potential and tube 78b will be ignited. The ignition therefore of either neon tube 78a or 78b indicates, respectively, that either point 66a or 66b is at high potential.

Specifically, in the embodiment as illustrated in Fig. 3, the number of elements employed in a ring is equal to one-half the number of steps in one complete double ring cycle, while the number of element portions, on the other hand is exactly equal to the number of steps. Assuming that one portion of an element, designated as the first element of the commutator, is "on" and corresponding portions of the remaining elements are "off," the first element portion conditions the next succeeding or second, corresponding element portion, so that upon the occurrence of an advancing pulse, the conditioned element portion is turned on. This second element portion, which is now "on," conditions a third corresponding element portion and, when the following advancing pulse occurs, this third element portion is switched on. Attention is directed to the fact that the corresponding portions of the first and second elements remain in "on" status, after performing their conditioning functions.

The above description is a general explanation of the operation of the commutator of the embodiment, as illustrated in Fig. 3, when two advancing pulses cause the "on" circuit position to advance by two. Were advancing pulses no longer applied, all three corresponding element portions would remain in "on" status and their companion element portions would remain in "off" status. When, however, the advancing pulses are again applied, stepping operations would again occur and further corresponding element portions would be turned on, in sequence. Should the total number of elements in a ring be four, that portion of the first element; which is a companion or opposite portion to that portion of the first element originally assumed as being "on"; would be conditioned, under control of the last or fourth element portion.

More specifically, assume that all right-hand portions, which will hereinafter be designated as (*r*) portions, of a total of four elements, are now "on," as the result of the operation as described. It is seen that all left-hand portions, which will be hereinafter designated as (L) portions, are now "off." Since the fourth (*r*) portion, in being "on," now conditions the (L) portion of the first element, the latter would become switched on by the fifth advancing pulse. Thereafter, each (L) portion of the remaining three elements is switched on in succession (with each (*r*) companion portion being switched off) under control of advancing pulses. After the eighth pulse, all (L) portions of the total of four elements are now "on" and all (*r*) portions are now "off." The fourth (L) portion, in being "on," now conditions the (*r*) portion of the first element, which would become switched on by the ninth advancing pulse, and thereafter the commutator would repeat its full cycle of double ring operation.

From the above, it is seen, that the elements are so interrelated and so intercontrol one another, that upon the application of advancing pulses there is a step-by-step operation of a ring of element portions to first an "on" status and then a step-by-step conditioning to an "off" status. Each element portion is so operated, in a definite sequential order, and when the final element portion of the double ring series is operated, as above, one cycle of the commutator is completed and a new cycle of sequential events is initiated. Referring to Fig. 3, there is illustrated therein a basic circuit having four elements or eight portions conductively connected into a double ring, the elements being respectively designated as S1, S2, S3 and S4. Parts of the elements of Fig. 3, which correspond in character to those of the circuit of Fig. 1, are given the same reference characters.

Referring to Fig. 3 and assuming that S1*r*, namely, the right-hand portion of element S1 is "on" and S2*r*, S3*r* and S4*r* are "off," the manner in which the latter three element portions are turned on, in succession, will now be described.

It is also assumed that pulses of the character as illustrated in Fig. 4–*a* are produced on resistance 72. The pulses produced on resistor 72 are applied to line 75, and, with switch 90 in the reverse position, are utilized to control the sequential operation of the commutator. To initiate continuous operation, switch 90 is thrown to the reverse position from that shown.

The screen of tube 69*b* (S2*r*) is conductively connected to the midpoint 77*b* of resistor 63*b* (S1*r*) through a screen current limiting resistor 74*b*. By virtue of this circuit arrangement, the screen voltage of tube 69*b* (S2*r*) is determined by that of point 77*b*, and, if S1*r* is "off," point 77*b* is near the potential of line 61, whereas, if S1*r* is "on," point 77*b* is at a high potential with respect to line 61. When the screen voltage of tube 69*b* (S2*r*) is low, a reduction of its negative grid bias has no effect on the tube. That is, a low screen voltage of tube 69*b* (S2*r*) serves as a shut-off for the tube. On the other hand, when the screen voltage of tube 69*b* (S2*r*) is high, a reduction of its negative grid bias causes increased current flow therethrough. For the normal grid bias, however, applied to the grid of tube 69*b* (S2*r*), a rise in its screen voltage has no effect on current flow through the tube.

Assuming, as stated above, that S1*r* is "on," point 66*b* (S1*r*) and the screen of tube 69*b* (S2*r*) are at a high potential, so that S1*r* conditions S2*r*, in order that it may be turned on when an advancing pulse is applied to the grid of its tube 69*b*. An advancing pulse (Fig. 4–*a*), produced on resistor 72, is effective via line 75 and switch 90, in its opposite position, to reduce the negative grid bias of tube 69*b* (S2*r*) increasing current flow therethrough and thereby tripping S2*r* to an "on" status, in the same manner as described in Section 2. The rise in potential of point 66*b* (S2*r*), coinciding with an advancing pulse, is indicated in Fig. 4–*c*. Comparison of this figure with Fig. 4–*b*, illustrates that both S1*r* and S2*r* are "on" at this time while S1L and S2L are "off."

If no further pulses produced on resistance 72 are applied to the commutator, S1*r* and S2*r* remain "on" while S3*r* and S4*r* remain "off." This would be indicated by the fact that the glow tubes 78*b* (S1*r* and S2*r*) would be ignited while glow tubes 78*b* (S3*r* and S4*r*) would be dark.

If it be assumed, however, that advancing pulses are continuously applied from resistance 72 to the commutator elements, as indicated in Fig. 4–*a*, the commutator of Fig. 3 will be continuously operated. To continue the above description, with S2*r* "on," since S2 and S3 are conductively interconnected similar to S1 and S2, as described above, and S3 and S4 are similarly conductively connected, there is a conditioning of S3*r* so that the next advancing pulse applied via line 75, and switch 90 in the opposite position, is effective to turn on S3*r*. The resultant rise in potential of point 66*b* (S3*r*), coinciding with an advancing pulse, is indicated in Fig. 4–*d*. It is seen from comparison of Fig. 4–*d* with Figs. 4–*b* and 4–*c*, that S1*r*, S2*r* and S3*r* are "on" at this time. S3*r* being "on," conditions S4*r* so that the latter may be turned on when the next succeeding advancing pulse appears on line 75. The manner in which S4*r* is tripped on is similar to that in which S2*r* and S3*r* were tripped on, as explained above. When such action occurs, point 66*b* (S4*r*) rises in potential, as is illustrated in Fig. 4–*e*.

Since all of the element portions S1*r*, S2*r*, S3*r* and S4*r* are now "on," all element portions of one ring of the electronic commutator have been operated. The screen of tube 69*a* of the left-hand portion of S1, namely S1L, is conductively connected to the midpoint 77*b* of resistor 63*b* (S4*r*) through a screen current limiting resistor 74*b* to interconnect the two rings of element portions. By virtue of this connection, the screen voltage of tube 69*a* (S1L) is determined by that of point 77*b* (S4*r*). If S4*r* is "off," point 77*b* is near the potential of line 61, and, if S4*r* is "on," point 77*b* is at a high potential with respect to line 61 and the same applies to the screen voltage of tube 69*a* (S1L). When the screen voltage of tube 69*a* (S1L) is low, a reduction of its negative grid bias has no effect. That is, a low screen voltage of tube 69*a* (S1L) serves as a shut-off for the tube. On the other hand, when the screen voltage of tube 69*a* (S1L) is high, a reduction of its negative grid bias causes increased current flow therethrough. For the normal bias applied to the grid of tube 69*a* (S1L), a rise in its screen voltage has no effect on current flow through the tube.

Since S4*r* is now "on," it conditions S1L so that the latter may be turned on when the succeeding advancing pulse appears on line 75 and is applied to the control grid of tube 69*a* (S1L). The manner in which S1L is turned on is similar to that in which S2*r*, S3*r* and S4*r*, inclusive, were turned on, as described above. When such action occurs, point 66*a* (S1L) rises in potential, as is illustrated in Fig. 4–*b* and operation of the second ring of element portions is initiated. The screen grid of tube 69*a* (S2L) is conductively connected to the mid-point of resistor 63*a* (S1L) via resistor 74*a*, and S1L, being "on," now conditions S2L so that the latter is tripped on, upon application of the succeeding advancing pulse to line 75 and the control grid of tube 69*a* (S1L). The manner in which S2L is turned on is similar to that in which S1L was tripped on, as just described. The resultant rise in potential of point 66*a* (S2L), is illustrated in Fig. 4–*c*. S2L is conductively connected to S3L, and S3L to S4L, in the same manner as S1L and S2L, as described above. S2L, being "on," now conditions S3L so that the latter is switched on, upon application of the succeeding advancing pulse to line 75. The manner in which S3L is turned on is similar to that in which S1L and S2L were tripped on, as described above. The resultant rise in potential of point 66a (S3L), is illustrated in Fig. 4–d. Upon the next advancing pulse, S4L is tripped on, in a manner now understood, and as illustrated in Fig. 4–e. Comparison of this figure with Figs. 4–b, 4–c and 4–d indicates that S1L to S4L, inclusive, are now "on." Since this is now the case, all companion portions of a ring have been operated and a completion of a full double ring operation of the electronic commutator has been reached. It is to be noted that the screen of tube 69b (S1r) is conductively connected to midpoint 77a of resistor 63a (S4L) through a screen current limiting resistor 74a to interconnect the two rings of element portions and thereby close the double ring. Accordingly, S4L, in being "on" conditions S1r so that the latter is switched on upon an application of a succeeding advancing pulse. The commutator now begins to repeat its full double ring sequential operation, with the result that S1r, S2r, S3r and S4r are tripped to an "on" status, in succession, as described in detail above.

It is now obvious that as long as advancing pulses are applied to the commutator circuit, the element portions S1r, S2r, S3r, S4r, S1L, etc. are turned on (and off) sequentially and independently of inductive or capacitative coupling since the element portions of the rings and the rings themselves are interconnected conductively only. It is also seen that a given element portion cannot be turned on until its predecessor corresponding element portion is "on." With this circuit arrangement, step-by-step progression, from one element portion to the next, is positive in character.

It is now deemed obvious, that since the element portions S1r, S2r, S1L, S2L, etc. are placed in an "on" and "off" status sequentially, that a series of sequential voltage changes is produced. Reference to Figs. 4–b to 4–e, inclusive, illustrates the disposition of the relative sequential times that points 66a and 66b of the S1L, S2L, S1r, S2r, etc. element portions are at high and low potentials. As is now also well understood, when point 66b of S1r, for example, is at a high potential, point 66a of S1L is at a low potential. Accordingly, decreased potentials are also sequentially produced by the operation of the element portions, said decreases being available at the respective points 66a of the element portions and these occur at the respective times indicated for the increased potentials at point 66b, as illustrated in Figs. 4–b to 4–e, inclusive. These sequentially timed voltage changes may be employed for controlling external circuits.

Referring to Fig. 3, whenever switch 90 is returned to the position, as shown, the application of advancing pulses to the commutator element portions is interrupted, thereby interrupting the continuous operation of the commutator. Also, as is now well understood, all of the element portions remain in the status to which they were last switched. Upon such return of switch 90 to the position, as shown, various ones of the element portions S1r, S2r, or S1L, S2L, etc. may remain in "on" (or "off") status. When switch 90 is again thrown, to the reverse position from that shown, the commutator resumes continuous operation, beginning at that element portion in the series which was the last to be turned on, without the necessity of starting from some arbitrarily chosen element portion.

Further consideration of the electronic commutator circuit, as disclosed in Fig. 3, indicates that advancing pulses, when applied to resistor 72, are effective via line 75 to concurrently reduce the negative grid bias of all tubes 69b, each comprising a part of element portions S1r, S2r, S3r and S4r and of all tubes 69a, each comprising a part of element portions S1L, S2L, S3L and S4L. It will be appreciated, however, that a negative grid bias reduction of tubes 69a and 69b, due to an advancing pulse, can cause increased current flow, respectively, therethrough, only when the respective screen is at high potential, and such screen is at this potential, only when a preceding, and usually a corresponding, element portion is "on." Assuming again that S1r is "on" and that S2r, S3r and S4r are "off," it follows that S1L is "off" and that S2L, S3L and S4L are "on." By virtue of the commutator circuit arrangement and under the conditions just assumed, the following conditions exist: (a) S1r being "on," conditions S2r, (b) S2L being "on" conditions S3L, (c) S3L being "on" conditions S4L, (d) S4L being "on" conditions S1r and (e) S2r being "off," does not condition S3r, (f) S3r being "off" does not condition S4r, (g) S4r being "off" does not condition S1L, and (h) S1L being "off" does not condition S2L. Since (e), (f), (g) and (h) are true, a negative grid bias reduction of tubes 69b (S3r and S4r), and 69a (S1L, S2L) has no effect on the status of S3r, S4r, S1L and S2L, respectively. Since (b), (c), and (d) are true, a grid bias reduction of tubes 69a (S3L and S4L) does not alter the "on" status of S3L and S4L and likewise a grid bias reduction of tube 69b (S1r) does not alter the "on" status of S1r. Accordingly, since (a) is true and even though an advancing pulse is applied to the grids of all tubes 69a and 69b, to thereby reduce their bias, such pulse is effective, only in tube 69b (S2r) to produce a change in status, with the result that S2r is tripped to "on" status, S2r being the sole element portion affected by said pulse.

The foregoing description, of course, relates to the commutator, when, in its normal operation, it is momentarily at rest, with the various element portions in a particular combinational arrangement of "on" and "off" conditions. Analysis of all other possible combinational arrangements which the element portions may have when the commutator is momentarily at rest during its sequential operation, would lead to the conclusion that, as in the case of the particular example given above, and irrespective of the "on" and "off" status of all element portions, an advancing pulse is effective, in only one portion (even though it is applied to every portion), to turn this one portion to an "on" status. With this circuit arrangement, advancing pulses from a common source are utilized to trip the element portions to an "on" (and "off") status in succession. It is to be noted that no second source of pulses is provided to trip element portions to an "off" status, since it will be appreciated, that upon tripping on a given portion, its companion portion is tripped off. Therefore, in the embodiment as illustrated in Fig. 3, the advancing pulses perform the dual function of turning element portions to both "on" and "off" status.

Assuming again, that S1r is "on," then the screen of tube 69b (S2r) is at a high potential, and an advancing pulse, which reduces its grid bias, causes increased current flow therethrough, and S2r is tripped on, as is now understood. As such action occurs, point 77b (S2r) rises in potential, as does also the screen voltage of tube 69b (S3r) connected to this point. It would therefore appear, offhand, that the advancing pulse which trips on S2r, might, by virtue of the resulting screen voltage rise of tube 69b (S2r), also cause S3r to trip to an "on" status. This rise in potential of point 77b (S2r), however, is not instantaneous but occurs exponentially (see Fig. 4–c) so that an interval of time elapses from the instant of pulse application until point 77b (S2r) reaches its maximum high point and the same applies also to the screen voltage rise of tube 69b (S3r). This time interval exceeds the duration of an advancing pulse so that said pulse ceases to be effective by the time that the screen of tube 69b (S3r) reaches its maximum voltage. Under these circmstances, tube 69b (S3r) experiences concurrently an increase of negative grid bias (because the amplitude of the advancing pulse is decreasing from its positive peak value) and an increase of positive screen potential, which two conditions oppose and prevent any substantial current flow through the pentode. It is seen, therefore, that only one element is tripped on for each advancing pulse. A slight current flow may occur in a tube of another element, but its magnitude is insufficient to trip S3r, for example, to an "on" status.

7. *Automatic conditioning of self-conditioning type electronic commutator*

As stated above, the embodiment of the electronic commutator, as illustrated in Fig. 3, requires no manual conditioning operation on the part of the operator prior to starting up the commutator or in other words, this species of the electronic commutator is self-conditioned, that is to say, regardless of the status assumed by the various element portions comprising the commutator when first energized; upon reversal of switch 90 to thereby supply advancing pulses to the commutator, the operation of these element portions is such to cause the portions to automatically arrange themselves so as to function in proper sequence, as described in detail in Section 6. Such automatic arrangement is brought about either by minute differences between similar circuits of the separate elements or by the particular status which the various elements may reach, when supplied with current, upon placing the commutator in operation.

Suppose, for example, that after energy is supplied to lines 50, 80, etc., S2r and S3r are "on" and S1r, S4r are "off"; this assumed status being one of the fifteen possible arrangements which a commutator, comprised of four elements, may reach. Comparison of this assumed arrangement, with any of the required arrangements of the element portions, as illustrated in Figs. 4–b to 4–e, inclusive, will indicate that this assumed arrangement, reached by chance, is not one of those attained by the commutator in its normal chosen sequential operation. An explanation will now be given of the manner in which the commutator elements automatically adjust themselves, from an arrangement assumed by chance, as assumed above, for example; to one attained upon normal operation. It is to be noted, that having once attained a normal operation, the various commutator element portions thereafter function sequentially as desired, as described in Section 6 and as illustrated in Figs. 4–d and 4–e, inclusive.

With the elements S1r, S2r, etc. in the chance status, as assumed above, S1L is conditioning S2L, S3r is conditioning S4r and S4L is conditioning S1r, in a manner now understood. Immediately following the reversal of switch 90, commutator advancing pulses are applied to line 75, as described above. The first of these pulses is effective to turn on S4r and S2L, but is ineffective to turn on, S1r, as will now be described. Since S4r is turned on, under control of S3r, point 66a (S4L) falls in potential concurrently with a grid bias reduction of tube 69b (S1r). Accordingly, as the negative grid bias of tube 69b (S1r) is reduced, its screen potential drops to a low value, thus preventing tube 69b (S1r) from passing an amount of current sufficient to turn on S1r. Thus, upon application of the first advancing pulse to line 75, following reversal of switch 90, the status of the commutator element portions is such that S1r and S2r are "off," and S3r, S4r are "on." It is seen from inspection of Figs. 4–b to 4–e, inclusive, that such is the status which the various commutator elements assume, after six advancing pulses have been applied in their normal sequential operation. The second, third, etc. advancing pulses which appear on line 75 thereafter, cause the commutator elements to function in the manner desired, and as shown in Figs. 4–b to 4–e, inclusive. The previously mentioned fifteen happenstance arrangements which the commutator elements may assume, include eight which are, individually, the desired arrangements of elements attained during their normal sequential operation. If the elements reach any of these eight arrangements, when they are supplied with current, it is deemed obvious that normal commutator operations proceed from the very first advancing pulse. With regard to the remaining seven happenstance arrangements, it can be shown, as in the arrangement assumed above, that the commutator elements automatically adjust themselves from said happenstance arrangements, to one of those attained upon normal operation, and thereafter function in the sequential manner desired.

Novel means are therefore provided including hard tube type electronic devices, conductively, sequentially connected into a single closed chain or ring, or into a double closed chain or ring, and operable in accordance with the rate of application of control electrical manifestations applied to said devices, whereby a chosen electrical condition can be sequentially and cyclically produced at a desired rate and in a positive manner.

While there has been shown and described and pointed out the fundamental novel features of the invention as applied to a plurality of embodiments, it will be understood that various omissions and substitutions and changes in the form and details of the device illustrated, and in its operation may be made by those skilled in the art, without departing from the spirit of the invention. It is the intention, therefore, to be limited only as indicated by the scope of the following claims.

What is claimed is:

1. An electronic commutator comprising a plurality of elements; each element including at least a pair of electron emitting devices and each device of said pair including an anode, a cathode and a control grid, a resistor for each device, means connecting said resistor in series with the space current path of its associated device, the respective devices of each pair with its associated resistor being connected in parallel; conductive means interconnecting said elements into a closed chain, means responsive to a change in current flow through one device for altering the bias of the other device whereby the current flow through said other device is altered to produce a change of electrical condition, said conductive means transferring said change to another element of said chain, a source of repeated electrical pulses, similar in all electrical characteristics, and means for simultaneously applying said pulses to said devices, respectively, whereby one of said pulses is effective on one device of said element controlled by the change of condition transferred from another element.

2. An electronic commutator comprising a plurality of elements; each element including at least a pair of electron emitting devices, each device of said pair including an anode, a cathode and a control grid, a resistor for each device, means connecting said resistor in series with the space current path of its associated device, said devices with their respective resistors being connected in parallel; electronic means connected in parallel, respectively, with the space current paths of said respective electronic devices and effective upon application of electrical pulses for alternately increasing the current flow through said respective devices of an element, means responsive to the increase in current flow through one device of an element for increasing the negative bias of the other device whereby the current flow through said other device is decreased, a source of electrical pulses, similar in all electrical characteristics, means for applying said pulses to said electronic means, simultaneously, and means conductively interconnecting said elements into a closed chain, whereby one electronic device of one element is controlled by another element.

3. An electronic commutator comprising a plurality of electronic elements, each element including a pair of hard tube type electron emission devices, means interconnecting said devices whereby a chosen electronic condition in one device inchoately conditions the other and vice versa, for assumption of said chosen condition upon application of one of a plurality of uniform repeated electrical pulses succeeding said inchoate conditioning and further conditioning, means conductively interconnecting said elements into a closed ring, succeeding elements being so further conditioned for operation to said chosen condition, upon assumption of said chosen condition by a chosen one of said devices of a preceding element and the first element being so conditioned by the last element, a source of uniform repeated pulses, and means for applying said electrical pulses to each of the devices of said elements to control the advance of said chosen condition through said ring.

4. An electronic commutator comprising a closed chain of hard tube type, a plurality of electronic elements, each operable to an on and to an off electrical condition, means controlled by the on condition of a first one of said elements conditioning solely, the succeeding or second element, presently in off condition, preparatory to operation to an on condition, advancing means continuously producing electrical pulses, cooperating with said second element, when conditioned, to turn said element on, said element when on conditioning said first element, preparatory to operation to an off condition, restoring means continuously producing electrical pulses cooperating with said first element when conditioned, to turn said element off, and each succeeding element bearing the same relationship to succeeding and preceding elements as said first and said second elements bear to each other whereby a single on condition is continuously advanced in seriatim, and repeatedly, through said chain.

5. An electronic commutator comprising a plurality of elements and each comprising a pair of triodes, a load resistor for each triode, a pentode for controlling the current flow through each of said load resistors, each triode and associated pentode having their space current paths connected in parallel, capacitative means coupling the control grids of said triodes respectively to the plate of the other triode, a grid of one pentode of all elements except the first connected to a junction of a resistor and pentode of a succeeding element and a grid of the other pentode connected to a junction of a resistor and pentode of a preceding element, and means conductively connecting a grid of a pentode of the first element to the junction of a resistor and pentode of the next succeeding element and a grid of the other pentode of said first element to the junction of a resistor and pentode of the last element whereby said elements are connected into a closed chain, and means for applying repeated control pulses simultaneously to another grid of each of said pentodes.

6. An electronic commutator comprising a plurality of elements; each element including at least a pair of electron emitting devices and each device of said pair comprising at least an anode, a cathode and a control grid, a resistor for each device, means connecting said resistor in series with the space current path of its associated device, the respective devices of each pair with its associated resistor being connected in parallel, conductive means interconnecting said elements into a closed chain whereby a change in current flow through one device alters grid bias of the other device so that the current flow through said other device is changed, means for operating said devices including a source of uniform electrical pulses of completely similar electrical characteristics, and means for simultaneously applying said pulses to said devices, respectively, said elements being so conductively interconnected that one of said pulses is rendered effective in one device only, of a chosen element, under control of a preceding element, and another pulse is rendered effective in the other device only, under control of a succeeding element, whereby said changed flow through one of said other devices is maintained until change of current flow in the corresponding device of its succeeding element.

7. An electronic commutator comprising a plurality of hard tube type electronic elements, each operable to an on and to an off electrical condition, means conductively interconnecting said elements into a closed chain, means controlled by the on condition of a first one of said elements conditioning solely, the succeeding or second element, presently in off condition, preparatory to operation to an on condition, advancing means, continuously producing electrical pulses, and applying said pulses to all of said elements simultaneously and cooperating with said second element, when conditioned, to turn said element on, said element when on conditioning said first element, preparatory to operation to an off condition, restoring means continuously producing electrical pulses and applying said pulses to all of said elements simultaneously and cooperating with said first element, when conditioned, to turn said element off, and each succeeding element bearing the same relationship to succeeding and preceding elements as said first and said second elements bear to each other whereby a single on condition is continuously advanced in seriatim, and repeatedly, through said chain, and means for initially adjusting said on condition to a chosen element in said chain.

8. An electronic commutator comprising a plurality of cyclically operable circuits, each including variable impedance electronic discharge tube means and each operable to an on and to an off condition under control of successive pulses, means conductively interconnecting said circuits into a ring whereby the on condition of one circuit conditions the next succeeding circuit, to be turned on upon application of an electrical pulse thereto, and whereby the next succeeding circuit conditions the preceding element to be turned off upon application of an electrical pulse thereto, and means for applying said electrical pulses simultaneously to said circuits to all advance the on condition of said circuits, successively and repeatedly through said ring, and means for initially adjusting a predetermined one only of said circuits, to on condition.

9. An electronic commutator comprising a plurality of elements, each element comprising a pair of electron emitting devices, each device of said pair comprising an anode, a cathode and a control grid, a resistor for each device, means connecting said resistor in series with the space current path of its associated device, the respective devices of each pair with its associated resistor being connected in parallel a pair of multigrid electron emitting devices for respectively controlling the flow through each of said resistors, means coupling the control grids of each device of said pair, respectively, to the plate of the other device; a grid of one multi-grid device of each element except the first connected to a point between a resistor and a control grid of a succeeding element and a grid of the other multigrid device of each element except the first connected to a similar point of a preceding element, a grid of a multi-grid device of the first element being connected to a similar point of the next succeeding element and a grid of the other multigrid device of said first element being connected to a similar point of the last element whereby said elements are connected into a closed chain and means for applying repeated control pulses to another grid of each of said multi-grid devices.

10. An electronic commutator comprising a plurality of elements and each comprising a pair of triodes each including a cathode, anode and control grid, a load resistor for each triode, means connecting one triode and associated resistor in parallel with the other triode and associated resistor, a pentode for controlling the flow through each of said load resistors, capacitative means coupling the respective control grids of said triodes to the plate of the other triode, means connecting a point between a resistor and a control grid of a preceding element to a grid of one pentode and a point between another resistor and control grid of a preceding element to a grid of the other pentode, a grid of a pentode of the first element being connected to a point between a resistor and control grid of the last element and a grid of the other pentode of said first element being connected to a point between another resistor and control grid of said last element, and means for applying repeated control pulses simultaneously to another grid of each of said pentodes.

11. An electronic commutator comprising a plurality of elements each comprising a pair of electron emitting devices and each device of said pair comprising an anode, a cathode and a control grid, a resistor for each device, means connecting said resistor in series with the space current path of its associated device, the respective devices of each pair with its associated resistor being connected in parallel, a pair of multi-grid electron emitting devices for respectively controlling the flow through each of said resistors, means coupling the control grids of each device of said pair, respectively, to the plate of the other device, means connecting one side of each preceding element to a grid of one multi-grid device of each element and the other side of each preceding element to a grid of the other one of the multi-grid devices of each element, a grid of a multi-grid device of the first element being conductively connected to one side of the last element and a grid of the other multi-grid device of said first element being conductively connected to the other side of said last element, and means for applying repeated control pulses to another grid of each of said multi-grid devices.

12. An electronic commutator comprising a double ring of electronic discharge relays, a control circuit for each relay, a controlled circuit for each relay, said control and controlled circuits being so connected that each relay in any one ring controls another relay in the same ring and the last relay in said one ring controls the first relay in the other ring, whereby sequential operation of the relays and of the rings, respectively, is obtained and means associated with each relay for receiving electrical energy to produce said sequential operation.

13. An electronic commutator comprising electronic discharge tube means producing a plurality of separate composite manifestations, each comprising pairs of two kinds of separate manifestations, reversible upon repeated operation, means, including a source of electrical energy for adjusting said electronic means continuously and in steps, and means for automatically resetting said electronic means to a chosen pattern of composite manifestations of different kinds.

14. An electronic commutator comprising a series of hard tube type electron emitting devices, means, including a source of electrical energy for sequentially operating said devices to produce repeatedly a predetermined sequence of different patterns of electrical conditions, and means so interconnecting said devices, that upon disruption of said predetermined series of patterns, continued operation of said series of devices automatically returns said series to one of said patterns, and thereafter maintains said predetermined sequence.

15. An electronic commutator or the like comprising a series of successively related electron discharge devices conditionable in an on or an off equilibrium state, a source of electrical pulses, input circuits for applying said pulses to the discharge devices, circuit connections between the devices for causing them to respond successively to a series of the applied pulses and in response thereto to trigger to their reverse equilibrium state and to remain in such reverse state, and further connections between the devices for automatically causing them in response to a separate, following series of pulses to revert successively to their previous equilibrium state.

16. An electronic commutator or the like comprising a series of electron discharge tube-containing commutator elements, each having one electrical equilibrium condition or a reverse condition, triggering circuits, including pulse receiving control grids associated with the discharge tubes, for reversing the equilibrium conditions of the elements, an external source of electrical pulses, means for applying the pulses to the grids of the triggering circuits for all said elements simultaneously, and means to cause the triggering circuits in response to a series of successively applied pulses derived from said source to reverse the condition of a corresponding series of the elements in sequence, one element after the preceding element, and in one direction only and thereafter, in response to a wholly following series of said pulses applied to the grids, to return each of the elements in sequence to its previous condition.

17. An electronic commutator or the like comprising a plurality of successively related commutator elements, each including two electron discharge devices, cross coupling connections between the two devices of each element to cause them to take opposite equilibrium states, at least one of the devices of each element including control means to receive an electrical pulse, means controlled by each element when its devices are in particular equilibrium states for cocking the next element to react to a pulse, and means for applying successive electrical pulses to the control means of all the elements simultaneously to cause each cocked element upon reception of a pulse by its control means to transmit said pulse directly through the cross connections to the two devices of the cocked element to cause them to shift to said particular equilibrium states so as to cock the next further element for reaction to a following applied pulse.

18. An electronic commutator comprising a series of successive circuits, each including electronic discharge means, for passing received pulses therethrough, each circuit having alternate electrical conditions, consonant with alternate electronic states of the discharge means therein, to either of which it may be shifted in response to impressed pulses, means for impressing electrical pulses upon said circuits simultaneously, and coupling means between each circuit and the preceding and following adjacent circuits, effective after a said circuit has passed a pulse therethrough and been shifted in response thereto, for preparing both the preceding and following circuits to respond to and pass subsequently impressed pulses therethrough.

19. An electronic commutator comprising a series of electron discharge devices, electrical connections from one device to the next for successively cocking the devices to be triggered by successive electrical pulses of a given energy applied to their inputs, means for causing the pulses of said given energy to be applied concurrently to the inputs of all the devices to trigger only the then cocked device, and means for causing pulses of greater energy to be applied concurrently to the inputs of a plurality of the devices to trigger them regardless of their being cocked or uncocked.

20. An electronic commutator or the like, comprising a series of circuits, each including a variable impedance electronic discharge device the impedance of which depends on its grid bias and determines one or another electrical condition of the circuit, a plurality of electronic tube means associated with the circuits respectively to control grid bias of the discharge devices in the circuits, means so conductively connecting each circuit to the tube means associated with a next circuit that a given electrical condition of each circuit prepares the tube means associated with a next circuit for a change in status by a pulse impressed on the tube means, such change in status of a tube means altering grid bias of the discharge device in the associated circuit so as to bring this circuit to the given condition, whereby the tube means are sequentially prepared for a change in status and successive pulses effect such change to bring each circuit sequentially to the given condition, and means for impressing successive electrical pulses on the tube means simultaneously for effecting the change in status of the tube means in the sequential order of their preparation for such change.

21. An electronic commutator or the like, comprising a series of circuits arranged to function in the manner of discrete elements of a commutator or the like, each circuit including at least a variable impedance electronic discharge tube and also an electronic discharge device connected with their space current paths in parallel to an impedance, said electronic discharge device having at least an anode, cathode, and grid, and operation of which is controlled by a pulse applied to the grid, thereby to adjust electrical condition of its circuit and impedance of the vacuum tube therein, means conductively connecting said circuits into a closed chain, a source of repeated electrical pulses, and means for applying said pulses to said grids to effect said operations of said devices.

22. An electronic commutator or the like, comprising a series of circuits, each including variable impedance hard type electronic discharge means, impedance of which determines electrical condition of the circuit, means connecting said circuits into a closed ring including solely conductive means connecting the output of a preceding circuit with the input of the next succeeding circuit and connecting the output of the last circuit to the input of the first circuit, with the electrical condition of each circuit being effective via the solely conductive connecting means to determine responsiveness of the electronic discharge means of the connected circuit to applied electrical pulses, means impressing said pulses upon said discharge means of all the circuits simultaneously so as to vary the impedance of any such discharge means rendered responsive in the aforesaid manner and whereby the electrical condition of its circuit is altered, and means in each circuit for sustaining the variable impedance electronic discharge means at the varied impedance.

23. An electronic commutator or the like, comprising a series of circuits, each having alternative relatively on and off sustained electrical conditions and each including a variable impedance electronic discharge device grid bias of which determines its impedance and is consonant with the electrical condition of the circuit, means so conductively connecting said circuits into a closed chain as to be sequentially adjusted in a cyclic manner, each to on and off condition by successive pulses impressed upon the circuits and alternately varying the grid bias of the included discharge devices, and means for continuously impressing said pulses upon all the circuits simultaneously, one pulse being effective to change the grid bias of a device in a circuit in a direction to increase the impedance of the device and a succeeding pulse to change the grid bias in a reverse direction to reduce the impedance and the circuit successively assuming the alternative electrical sustained conditions consonant with the changes in impedance of the device therein.

24. An electronic commutator or the like, comprising a ring of circuits, each including electronic discharge tube means with control means acting through the discharge tube means to adjust the circuit to one or another of alternative electrical conditions, conductive means so interconnecting the circuits that each in a chosen condition prepares the following circuit for subsequent adjustment to the chosen condition and prepares the preceding circuit for subsequent adjustment to the alternative condition, and means applying a succession of pulses to all the circuits simultaneously, one such pulse being effective upon the control means in a said following circuit to adjust it, after being prepared therefor, to the chosen condition and a separate such pulse being effective upon the control means of a said preceding circuit to adjust it, after being prepared therefor, to the said alternative condition.

25. An electronic commutator or the like, comprising a plurality of circuits, each with electronic discharge tube means a change in impedance of which is concomitant with a change in current flow in the circuit, means conductively connecting said circuits into a ring, means rendered effective by a change of current flow through a first circuit for preparing the next circuit for a change in current flow upon subsequent application of a pulse to the latter circuit, a change in current flow of the latter circuit preparing the first circuit for return to an initial status of current flow by a pulse subsequently applied thereto, means rendered effective by a change in current flow through the last circuit of the ring for preparing the first circuit for repeat change in current flow from said initial status, and means impressing a series of pulses upon said circuits simultaneously to produce said changes in current flow of each circuit following the preparation thereof for such change.

26. An electronic commutator or the like comprising a plurality of circuits, each including a plurality of electronic discharge devices, means electrically connecting the circuits into a closed network and including means for enabling one of the discharge devices of different ones of said circuits to be adjusted sequentially to a given electrical condition and after such sequential adjustment of a device from each circuit enabling sequential adjustment of another of the devices from each circuit to a given electrical condition, whereby first one set of said devices, one from each circuit, and thereafter another set of said devices, one from each circuit, are adjustable to a given electrical condition in a repeated cyclic manner, and pulsing means common to the circuits for impressing pulses upon said circuits to effect said adjustments sequentially of the devices in each set, and of one set after the other, in said cyclic manner.

27. An electronic commutator or the like, comprising a series of similar circuits, each including a pair of electronic discharge devices with associated control means, means connecting one device in each circuit to a corresponding device in the next circuit to form a chain of devices successively operable to a given status by a succession of pulses impressed upon the related control means, means similarly connecting another of the devices in each circuit to a corresponding device in the next circuit to form a second chain of devices successively operable to said given status by a second succession of pulses impressed upon the related control means, a pulsing source common to the circuits, and means for impressing pulses derived from the source upon said control means of the circuits to effect the successive operations of the devices in one chain after the other chain.

28. An electronic commutator or the like comprising a plurality of circuits, each with electronic discharge tube means, means electrically connecting the circuits into a closed network and including means acting through the tube means of one circuit after another for preparing said circuits sequentially in one direction for adjustment at a chosen point, of each circuit, to a given electrical condition and after sequential adjustment of said points has been effected for preparing said circuits sequentially in one direction for adjustment at another point, of each circuit, to a given electrical condition, said combined adjustments being repeated to produced intermittent cyclic adjustments of said different points of the circuits, and means for impressing pulses upon said circuits to effect said adjustments in a cyclic manner in accordance with the sequential order in which the circuits are prepared for said adjustments.

29. An electronic commutator or the like, comprising a number of circuits, each including electronic tube means for determining relatively on and off electrical status of as least two points of the circuit, means connecting the circuits so that the on status of one such point of a circuit prepares the next circuit only for adjustment of its corresponding point to on status, means connecting the last circuit to the first circuit so that upon such corresponding point of the last circuit being adjusted to on status the non-corresponding point only of the first circuit is prepared for adjustment to on status, means further connecting the circuit so that each such non-corresponding point when in on status prepares only the next circuit for adjustment of its non-corresponding point to on status, whereby the circuits are prepared in one direction only for adjustment sequentially to on status of first one series of points and thereafter of another series of points, and means impressing electrical pulses on the circuits to operate through their tube means to bring said adjustments sequentially into effect in the order of the sequential preparation for said adjustments.

30. An electronic commutator or the like, comprising a series of circuits, each including electronic discharge tube means determining different electrical conditions of a pair of points of the circuit, a series of such corresponding points of the circuits being successively adjustable to a certain electrical condition under control of successive electrical pulses transmitted to the tube means of the circuits and each of the paired points of the circuits being concomitantly adjustable to a relatively reverse electrical condition, means connecting said series of circuits so that said certain condition of each point of a circuit prepares for the corresponding point only of the next succeeding element for adjustment to said certain condition upon transmission of a pulse to the tube means of the latter circuit, means supplying successive pulses, and means transmitting these pulses to the tube means of the different circuits, each pulse being simultaneously transmitted to each said tube means to cause the sequential adjustment to said certain condition of first one set of corresponding points of the circuits and thereafter of another set of corresponding points of the circuits in the order of their sequential preparation for such adjustment.

31. An electronic commutator or the like, comprising a plurality of circuits, each including a pair of electronic discharge devices, corresponding devices of succeeding circuits being operable to on condition successively and cyclically under control of successive electrical pulses, and non-corresponding devices being simultaneously operable to an off condition, means connecting said plurality of circuits so that the on condition of each device of a pair conditions only the corresponding device of the next succeeding circuit sequentially, preparatory to being turned on upon application of an electrical pulse to the latter circuit and means for applying electrical pulses to said circuits simultaneously to effect turning on of one set of corresponding devices sequentially and thereafter of another set of corresponding devices sequentially in the order in which they are sequentially conditioned for such operation.

32. An electronic commutator comprising a plurality of circuits, each including a pair of electron emitting devices with associated pulse receiving control means, said devices being so connected into the circuit as to be operable simultaneously to different ones of two sustained electrical on and off conditions, means electrically connecting said circuits into a closed network, whereby upon application of successive control pulses to said control means the pairs of devices are dually, cyclically, sequentially operated, each corresponding device being sequentially operated to on condition and its companion device simultaneously to off condition and then, after the corresponding devices of the circuits have been operated to on condition, each companion device being sequentially operated to on condition and its associated, corresponding device, simultaneously to off condition, and means impressing control pulses simultaneously upon all of said control means to effect said dual, sequential operation of the pairs of devices of one circuit after another.

33. An electronic commutator comprising a plurality of circuits, each including a pair of electron emitting devices, said devices of each circuit being operable simultaneously, to different ones of two sustained electrical relatively on and off conditions, means controlled by the on condition of one device of said circuits conditioning solely the corresponding portion device of the next succeeding circuit, presently in off condition, preparatory to operation to an on condition, advancing means producing electrical pulses and supplying each said pulse simultaneously to all said corresponding devices of succeeding circuits to turn said devices on, when so conditioned, each circuit bearing the same relationship to its succeeding circuit whereby the occurrence of on conditions of corresponding devices is increased in number sequentially, the corresponding device of the last circuit, however, conditioning the non-corresponding companion device of the first circuit, preparatory to operation to an on condition, to thereby repeat the increase of on conditions, in said companion devices, the companion device of said last circuit conditioning said corresponding device of said first circuit.

34. An electronic commutator or the like, comprising a plurality of circuits, each including a pair of electronic discharge devices with associated control means, means connecting said devices serially to electrically form a double ring, each ring of devices being sequentially operable to an increasing series of a given electrical condition by pulses applied to their respective control means and the other ring of companion devices concomitantly to a decreasing series of said conditions, and means for thus operating said devices sequentially comprising a pulse source and means for applying successive pulses derived therefrom simultaneously to all said control means.

35. An electronic commutator or the like, comprising a plurality of circuits containing electronic discharge tube means, means connecting pairs of branches of the circuits serially to electrically form a double ring of such branches, each ring of branches being sequentially operable to an increasing series of a given electrical condition in corresponding branches and the other ring of branches being concomitantly operable to a decreasing series of said condition, pulse producing means and means for impressing said pulses on all the circuits simultaneously to operate through the electronic tube means thereof to effect said sequential operations of the branches of one ring after the other ring in a cyclic manner.

36. An electronic commutator or the like, comprising a plurality of variable impedance electronic discharge tubes, an electronic discharge device paired with each tube for adjusting its impedance, means for conditioning each discharge device in accordance with the impedance condition of an unpaired tube and including means conductively connecting the output circuit of the latter tube to a control circuit of the latter discharge device, whereby the pairs of tubes and devices are serially connected into a closed chain, a source of electrical pulses, and means for applying simultaneously to each of said discharge devices a series of said pulses for sequentially operating the conditioned devices to adjust impedance of the companion tubes at a rate determined by the rate of application of said pulses.

37. An electronic commutator or the like, comprising a series of circuits, each including electronic discharge tube means operable in response to a pulse applied to an electrode thereof to shift the circuit from one of alternative states to the other, means for applying successive pulses to electrodes of the tube means of all the elements simultaneously, and means so connecting the circuits as to enable only a single circuit to be shifted in condition under control of each pulse, said connecting means comprising unidirectional coupling connections between successive circuits to prepare them in succession for individual, but sequential shifting operation relative to the preceding element, by successive pulses applied to the control electrodes of the associated tube means.

38. An electronic commutator or the like, comprising a series of circuits, each including electronic discharge tube means with pulse receiving control means acting through the tube means to determine either of relatively reverse electrical conditions of the circuit, connections between each circuit and both the preceding and following adjacent circuits whereby each circuit when in a given condition prepares both the preceding and following circuit for adjustments in condition in response to pulses subsequently applied to the pulse receiving control means thereof, means continuously supplying electrical pulses, and means connecting the control means of all the circuits to said pulse supplying means whereby each circuit is adjusted by one said pulse to the given condition and the preceding and following circuits are subsequently adjusted upon their control means being pulsed subsequently and directly by the pulse supplying means.

39. An electronic commutator or the like, comprising a series of circuits arranged to function as commutator units, each circuit including electronic discharge means with pulse receiving control grids to act through the discharge means to adjust electrical condition of the circuit, means so connecting the circuits that each circuit when adjusted to a given electrical condition pre-conditions the following circuit for adjustment to the given condition and the preceding circuit for adjustment to a different electrical condition, means continuously supplying electrical pulses to the control grids to effect, by the pulsing of the grid of one circuit, adjustment of the latter circuit to the given condition and said preconditioning of the following and preceding circuits, and by subsequent pulsing, directly by said pulse supplying means, of the control grids of said following and preceding circuits to effect the respective adjustments thereof to said given condition and to said different condition.

ARTHUR H. DICKINSON.

REFERENCES CITED

The following references are of record in the file of this patent:

UNITED STATES PATENTS

| Number | Name | Date |
|---|---|---|
| 1,932,589 | Holden | Oct. 31, 1933 |
| 1,972,535 | Page | Sept. 4, 1934 |
| 2,006,346 | Curtis | July 2, 1935 |
| 2,011,381 | Suits | Aug. 13, 1935 |
| 2,017,708 | Bedford | Oct. 15, 1935 |
| 2,069,521 | Davis | Feb. 2, 1937 |
| 2,099,065 | Holden | Nov. 16, 1937 |
| 2,136,621 | King et al. | Nov. 15, 1938 |
| 2,154,492 | Clough | Apr. 18, 1939 |
| 2,157,690 | Clough | May 9, 1939 |
| 2,158,285 | Koch | May 16, 1939 |

Certificate of Correction

Patent No. 2,573,316

October 30, 1951

ARTHUR H. DICKINSON

It is hereby certified that error appears in the printed specification of the above numbered patent requiring correction as follows:

Column 25, line 10, for "element" read *circuit*; column 30, line 26, for "as" read *at*;

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*